UNITED STATES PATENT OFFICE.

SIEGFRIED HILPERT, OF BONN-ON-THE-RHINE, GERMANY, ASSIGNOR TO HIMSELF AND DEUTSCH LUXEMBURGISCHE BERGWERKS-UND HÜTTEN AKTIENGESELLSCHAFT, OF BOCHUM, GERMANY.

PROCESS FOR THE TREATMENT OF WASTE SULPHURIC ACID.

1,427,386.  Specification of Letters Patent.  Patented Aug. 29, 1922.

Application filed July 9, 1921. Serial No. 483,605.

*To all whom it may concern:*

Be it known that I, SIEGFRIED HILPERT, a German citizen, residing at Bonn-on-the-Rhine, Germany, have invented Processes for the Treatment of Waste Sulphuric Acids (for which I have made application in Germany May 12, 1916), of which the following is a specification.

The so-called waste acids occurring in the purification of the light oils of coal tar by sulphuric acid absorb certain impurities from the oil to be purified and under the action of the sulphuric acid these impurities undergo a more or less radical transformation forming in the course of the process, resinous products.

The object of the present invention is to obtain these resinous products in a form in which they may be used directly as lacquering substances or varnishes as well as a drying medium for addition to other lacquering substances, and more especially to coumarone resin-lacquer or varnish. It is of primary importance that for this purpose the resinous substances obtained from the waste acids should be in as translucent and clear a condition as possible, because otherwise there is no possibility of their finding application either as lacquer or as an agent for drying lacquer.

According to the present invention the resinous constituents of the waste sulphuric acid are obtained in a comparatively clear condition by dissolving them in a volatile liquid aromatic hydrocarbon. The acid is separated from the resinous constituents, in known manner, by the addition of water, and the only point to be attended to is that the heat evolved by the solution in water of the sulphuric acid should not be allowed to raise the temperature of the reacting substance so high that an injurious dark coloration of the resinous bodies sets in. The specific gravity of the resinous solution must be always less than that of the diluted acid so that it may neither fall to the bottom of nor become mixed with the diluted acid to form mixtures in suspension which cannot be separated.

The resin solution in the aromatic hydrocarbon may be immediately added to resinous lacquers and will then act beneficially in the drying of a lacquer coating and especially if the lacquer contain coumarone resin. The resinous substance may also be isolated from the solvent material and is then obtained in the form of a clear yellow powder. The translucent colour of the resin powder obtained depends on the employment of aromatic hydrocarbons as solvents as the boiling point of the hydrocarbon is so low that, when the solvent is driven off, no disturbing transformations of the resin, which are associated with dark coloration, set in. The powder also may be utilised as an addition to lacquers and will then, in the same way, assist the drying more especially in the case of coumarone resin lacquer.

What I claim is:—

1. Process for the recovery of resinous products from the waste occurring in the purification of the light oils of coal tar by sulphuric acid consisting in dissolving the resinous constituents in an aromatic hydrocarbon.

2. Process for the recovery of resinous products from the waste occurring in the purification of the light oils of coal tar by sulphuric acid consisting in dissolving the resinous constituents in an aromatic hydrocarbon and separating the acid from the resinous constituents by the addition of water in quantity to prevent the heat evolved from raising the temperature so high that an injurious dark coloration of the resinous constituents set in.

3. Process for the recovery of resinous products from the waste occurring in the purification of the light oils of coal tar by sulphuric acid, consisting in dissolving the resinous constituents in an aromatic hydrocarbon to a desired specific gravity, and diluting the acid in the mass with water to a specific gravity higher than that of the resinous solution.

SIEGFRIED HILPERT.